Aug. 22, 1961  W. L. GSCHING  2,996,932
VEHICLE DRIVE

Filed Feb. 18, 1957  2 Sheets-Sheet 1

INVENTOR.
Wilhelm L. Gsching
BY
Patent Agent.

Aug. 22, 1961 W. L. GSCHING 2,996,932
VEHICLE DRIVE

Filed Feb. 18, 1957 2 Sheets-Sheet 2

INVENTOR.
Wilhelm L. Gsching
BY
Patent Agent

United States Patent Office 2,996,932
Patented Aug. 22, 1961

2,996,932
VEHICLE DRIVE
Wilhelm L. Gsching, Heidenheim (Brenz), Germany, assignor to J. M. Voith G.m.b.H., Maschinenfabrik, Heidenheim (Brenz), Germany
Filed Feb. 18, 1957, Ser. No. 640,665
Claims priority, application Germany Feb. 20, 1956
12 Claims. (Cl. 74—677)

The present invention relates to a vehicle drive including a hydromechanical compound drive and a device for starting the driving engine.

With motor vehicles driven by an internal combustion engine and equipped with a mechanical power transmission, the motor can be started by towing or pushing the vehicle. This is generally not possible with motor vehicles having a hydraulic power transmission. This is also true for hydraulic transmissions with divided output, i.e. for transmissions in which the hydraulic torque converter is preceded by a power dividing planetary gear transmission or is followed by a planetary summary transmission which comprises a mechanical and a hydraulic power path and in which the power transmission is effected either simultaneously over both power paths or over the mechanical power path only. With such differential-torque converter transmissions, the pumping wheel is driven in the wrong direction of rotation when the drive is effected from the rear or with the motor at a standstill. To the torque required for this purpose corresponds the supporting torque in the planetary gear transmission which is governing the torque (drag torque) to be conveyed to the motor shaft, which last mentioned torque however is not sufficient to start the cold engine.

It is, therefore, an object of the present invention to provide a vehicle drive which will overcome the above mentioned drawback.

It is another object of this invention to provide a device which will make it possible at any desired time and by simple means to start an internal combustion engine also when it is equipped with a compound drive comprising a torque converter and a planetary gear transmission.

It is a further object of this invention to provide an arrangement as set forth in the preceding paragraphs which will be relatively simple and will be reliable.

Figure 1:
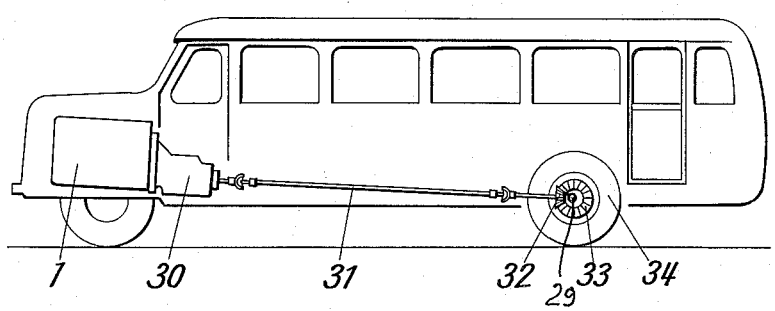

These and other objects and advantages of the invention will appear more clearly from the following specification in connection with the accompanying drawings, in which:

FIG. 1 shows a vehicle in form of a bus equipped with an arrangement according to the present invention.

FIGS. 2 to 5 diagrammatically illustrate on a somewhat larger scale than that of FIG. 1 the arrangement according to the present invention in detail and respectively represent four different embodiments of the invention.

*General arrangement*

The vehicle drive according to the present invention comprises a hydromechanical compound drive conveying the driving power from a motor to the driving wheels of the vehicle and includes a power dividing bevel gearplanetary gear transmission and a mechanical and a hydraulic power path with torque converter. The arrangement is such that a first main member of the planetary gear transmission is drivingly connected to said motor while a second main member of the planetary gear transmission is drivingly connected with the output shaft of the transmission. A third main member of the planetary gear transmission is drivingly connected to the pumping wheel of the torque converter. According to the invention, a locking mechanism as for instance a free wheel drive or a one-way clutch is interposed between said third main member of the planetary gear transmission and a stationary transmission element in such a way that with the engine at a standstill and the transmission output shaft driven by the driving wheels in a positive direction of rotation, said locking mechanism will prevent said third planetary gear transmission main member from being driven in opposite direction.

The arrangement according to the invention is furthermore provided with control means operable selectively to make the hydraulic power path ineffective.

Inasmuch as with driving vehicle and the motor at a standstill, the above mentioned third main member of the planetary gear transmission has the tendency to turn in wrong direction but according to the invention is prevented from doing so by the locking mechanism referred to above, this third main member serves as fixed support so that the planetary gear part connected with the motor and therefore the motor will be positively driven in the positive direction of rotation—rigid mechanical connection. In this way, also a cold engine can be safely started in the same manner as is the case with purely mechanical transmissions without the necessity of any special manipulations or adjustment with regard to the transmission.

For the sake of completeness it may be added that a differential torque converter transmission is known in which a mechanical transmission is made effective by locking the pumping wheel of the converter by means of a brake through the intervention of an oil pressure actuated servo-piston in conformity with the motor filling and the driving speed. With such a drive, it would be possible to start the engine by pulling or pushing the vehicle if additional means would be provided for actuating said brake for starting purposes. However, this would require that the oil pressure is produced by a pump which can be driven independently of the transmission shaft. Furthermore, additional manipulations for the desired effect would have to be carried out from the outside.

If the said brake were actuated manually in a mechanical manner, it would be necessary in addition to effecting the mechanical manipulation to provide an additional velocity range adapted to be made effective whenever desired in order to be able, subsequent to the starting, to disconnect the connection with the axle. The above possibilities of solving the problem underlying the present invention are, however, cumbersome and cannot always be carried out whereas the arrangement according to the present invention excels by its great simplicity, automatic function and reliability.

*Structural arrangement*

Referring now to the drawings in detail and FIG. 1 thereof in particular, the bus shown therein comprises an internal combustion engine 1 the output of which is conveyed to the rear axle 29 and to the driving wheels 34 through a hydromechanical compound transmission 30, a Cardan or propeller shaft 31 and a bevel gear axle transmission 32, 33. In order to be able, in spite of the hydraulic transmission to start the internal combustion engine by pulling or pushing the vehicle, the transmission is designed in conformity with the present invention as illustrated in the various embodiments of FIGS. 2 to 5. Each of the said embodiments comprises a hydromechanical compound transmission with a power dividing planetary gear transmission and a torque converter. According to FIG. 2 the planetary gear transmission is designed as bevel gear transmission whereas according to FIG. 3 the planetary gear transmission is designed as one-plane spur gear transmission. The embodiments of FIGS. 4 and 5 employ a two-plane spur gear transmission as planetary gear transmission.

Figure 2:
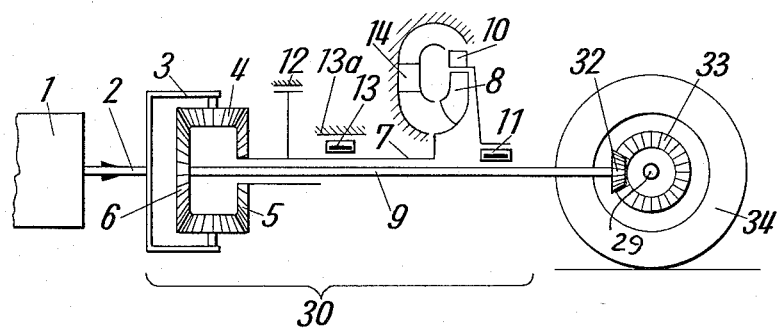

According to FIG. 2, the engine 1 drives the planetary gear carrier 3 through the intervention of the engine shaft 2. The planetary gears 4 mesh with the sun wheel 5 connected to the shaft 7 of the pumping wheel 8 pertaining to the torque converter. The planetary gears 4 furthermore mesh with the bevel gear 6 which is rotatably connected to the shaft 9 drivingly connected to the vehicle axle 29. The turbine wheel 10 of the torque converter is connected to the output shaft 9 through a free wheel clutch 11. By means of a brake 12, the pumping wheel shaft 7 and thus the sun wheel 5 connected thereto may be held stationary. Furthermore, a locking mechanism 13 in form of a free wheel drive is arranged on shaft 7 which locking mechanism prevents a rearward rotation of the pumping wheel shaft 7 by supporting itself by the fixed transmission casing diagrammatically illustrated by the reference numeral 13a. The reference numeral 14 designates the guide wheel of the torque converter.

When the torque converter with power division is effective, the brake 12 is made ineffective, and the motor output is conveyed to the output shaft partly hydraulically through sun wheel 5 and the torque converter and partly mechanically through the other sun wheel 6. When making the brake 12 effective, the purely mechanical velocity range is made effective with which the turbine wheel 10 of the torque converter is disconnected from the output shaft through the free wheel drive 11. The starting of the engine by pushing or pulling the vehicle is possible not only with the purely mechanical transmission condition, in other words when the brake 12 is made effective, but is also possible when the transmission is in its condition for divided power transmission, i.e. power transmission partly mechanically and partly hydraulically. In this condition, the pumping wheel shaft 7 and the sun wheel 5 are held stationary by means of the locking mechanism 13 and the stationary casing portion 13a. The planetary gear wheels 4 driven by the sun wheel 6 will then roll on the sun wheel 5 and will thus drive the motor shaft 2 in forward direction whereby the engine 1 is started.

A modification of FIG. 2 is possible in which the brake 12 is omitted. In this instance the transmission can work during ordinary driving in its hydromechanical velocity range only. While in this instance it is not possible to shift the transmission to a purely mechanical velocity range or transmission, the effect of the free wheel drive 13 in connection with the starting of the engine still remains unchanged.

Figure 3:
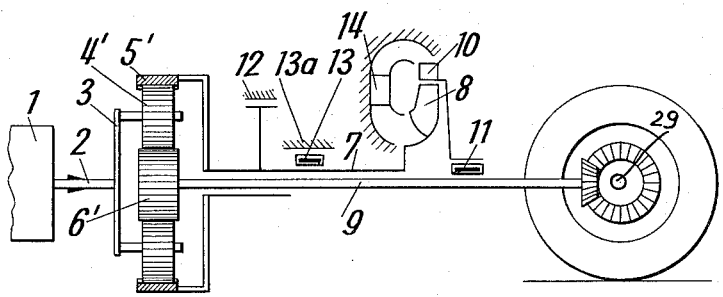

Referring now to FIG. 3, the transmission illustrated therein differs from that of FIG. 2 merely in that for purposes of output division, the bevel gear planetary gear transmission of FIG. 2 has been replaced by a one-plane spur gear—planetary gear transmission. As will be evident from a comparison of FIG. 3 with FIG. 2, the spur gears 4', 5' and 6' of the arrangement of FIG. 3 correspond to the bevel gears 4, 5 and 6 of FIG. 2. Otherwise the arrangement of FIG. 3 fully corresponds to that of FIG. 2 and, therefore, the same parts have been designated with the same reference numerals.

Figure 4:
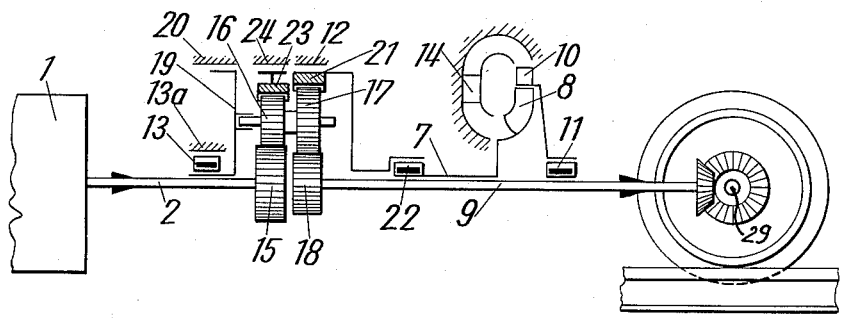

Referring now to FIG. 4, the arrangement illustrated therein comprises a motor shaft 2 having rotatably connected thereto the sun wheel 15 which meshes with a first set of planetary gears 16. The second set of planetary gears 17 fixedly connected with the gears 16 meshes with the sun wheel 18 connected to the output shaft 9. The planetary gear carrier 19 has an outer portion which forms a brake drum adapted to be held stationary by a brake 20. The inner portion of the planetary gear carrier 19 is adapted through a locking mechanism 13 and the fixed transmission casing to be held stationary so that it cannot rotate in the wrong direction. The large planetary gears 17 mesh with the teeth of a gear ring 21 which latter through the intervention of a free wheel drive 22 is connected with the pumping wheel shaft 7 and is adapted to be held stationary by a brake 12. The small planetary gears 16 mesh with the teeth of a gear ring 23 adapted to be held stationary by a brake 24.

When the compound hydraulic mechanical velocity range is to be employed, all three brakes are in ineffective position. For the first, i.e. lowest purely mechanical forward speed range, the brake 20 is made effective whereas for the next mechanical forward speed range the brake 24 is made effective. For the fastest mechanical forward speed range, the brake 12 is made effective. When the vehicle is pushed with its mixed hydraulic mechanical velocity range in effect, the planetary gear carrier 19 rests through the locking mechanism 13 against its fixed surrounding i.e. fixed transmission casing, and thus makes possible to start the motor through a rigid mechanical power path. This drive may also be modified by omitting one or more of the control brakes 20, 12 and 24 as well as the outer gear ring 23. In such an instance a correspondingly smaller number of purely mechanical velocity ranges will be obtainable. Such a device may be used for instance for driving a rail vehicle.

Figure 5:
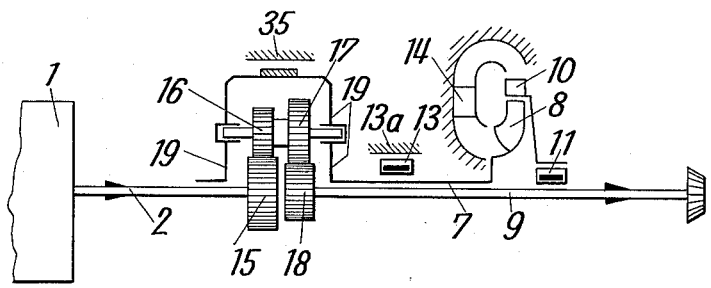

The drive according to FIG. 5 is likewise equipped with a two-plane distributing planetary gear transmission but otherwise it is somewhat modified over FIG. 4 and above all, considerably simpler than the latter inasmuch as no outer gear rings are provided.

According to FIG. 5, the planetary gear carrier 19 is rigidly connected with the pump wheel 8 of the torque converter and is furthermore adapted to be held stationary by means of a control brake 35. When brake 35 is in its ineffective position, the transmission works with power division, i.e. the motor output is conveyed partly hydraulically and partly mechanically to the driving wheels of the vehicle. When the brake 35 is made effective whereby the planetary gear carrier 19 is held stationary, the now sole purely mechanical velocity range is made effective. The free wheel drive 13 arranged in conformity with the present invention will act in the same manner as has been described in connection with FIG. 4.

It is, of course, to be understood that the present invention is, by no means, limited to the particular constructions shown in the drawings but also comprises any modifications within the scope of the appended claims.

What I claim is:

1. In a hydromechanical compound transmission having a transmission housing and being adapted to establish driving connection between a driving motor and an axle of a vehicle, the combination of: a stationary element fixedly connected to said housing; an input shaft for driving connection with said motor; an output shaft for driving connection with said axle; a hydraulic torque converter having a pumping wheel and being arranged for driving connection with said output shaft, power dividing planetary gear means including at least three main members, a first member drivingly connected to said input shaft, a second member drivingly connected to said output shaft, and a third member drivingly connected to the pumping wheel of said converter; and free wheel means interposed between said third member and said stationary element, said free wheel means permitting rotation of said third member in its normal direction only while preventing rotation of said third member in a direction opposite thereto.

2. In a hydromechanical compound transmission having a transmission housing and being adapted to establish driving connection between a driving motor and an axle of a vehicle, the combination of: a stationary element fixedly connected to said housing; an input shaft for driving connection with said motor; an output shaft for driving connection with said axle; a hydraulic torque converter having a pumping wheel and being arranged for driving connection with said output shaft, power dividing planetary gear means including a first member drivingly connected to said input shaft and a second member drivingly connected to said output shaft, said planetary gear means also including a third member drivingly connected to the pumping wheel of said converter; control means operatively connected with said converter for preventing said converter to convey driving power to said output shaft, and free wheel means interposed between said third member and said stationary element, said free wheel means permitting rotation of said third member in its normal direction only while preventing rotation of said third member in a direction opposite thereto.

3. In a hydromechanical compound transmission having a transmission housing and being adapted to establish driving connection between a driving motor and an axle of a vehicle, the combination of: a stationary element fixedly connected to said housing; an input shaft for driving connection with said motor; an output shaft for driving connection with said axle; a hydraulic torque converter having a pumping wheel and being arranged for driving connection with said output shaft, a two-plane spur gear planetary gear transmission including a first sun wheel drivingly connected to said input shaft and also including a second sun wheel drivingly connected to said output shaft, said planetary gear transmission also including a planetary gear carrier drivingly connected to said pumping wheel; and free wheel means interposed between said planetary gear carrier and said stationary element, said free wheel means permitting rotation of said third member in its normal direction only while preventing rotation of said third member in a direction opposite thereto.

4. In a hydromechanical compound transmission having a transmission housing and being adapted to establish driving connection between a driving motor and an axle of a vehicle, the combination of: a stationary element fixedly connected to said housing; an input shaft for driving connection with said motor; an output shaft for driving connection with said axle; a hydraulic torque converter having a pumping wheel and being arranged for driving connection with said output shaft, a two-plane spur gear planetary gear transmission including a first sun wheel drivingly connected to said input shaft and also including a second sun wheel drivingly connected to said output shaft, said planetary gear transmission also including a planetary gear carrier drivingly connected to said pumping wheel; brake means associated with said planetary gear carrier and operable selectively to hold the latter stationary, and free wheel means interposed between said planetary gear carrier and said stationary element, said free wheel means permitting rotation of said third member in its normal direction only while preventing rotation of said third member in a direction opposite thereto.

5. In a hydromechanical compound transmission for establishing driving connection between a driving motor and an axle of a vehicle, the combination of: a stationary element; an input shaft for driving connection with said motor; an output shaft for driving connection with said axle; a hydraulic torque converter having at least two rotatable blade wheels namely a pumping wheel adapted to be drivingly connected to said input shaft, and a turbine wheel adapted to be drivingly connected to said output shaft; planetary gear means including at least three main members namely a first member drivingly and mechanically only connected to said input shaft, a second member drivingly connected to said output shaft and a third member drivingly connected to one of said rotatable blade wheels of said converter; and free wheel means interposed between said stationary element and such member of the planetary gear as tends to rotate slowest in the direction opposite to its normal direction if said input shaft is at a standstill and if said output shaft is driven in the positive direction of rotation by said axle, the arrangement being such that said free wheel means permits rotation of said last mentioned planetary gear member in its normal direction only while preventing rotation thereof in a direction opposite thereto.

6. A hydromechanical compound transmission according to claim 5, in which said planetary gear means is designed as bevel gear planetary gear transmission.

7. A hydromechanical compound transmission according to claim 5, in which said planetary gear means is designed as one-plane spur gear planetary gear transmission.

8. A hydromechanical compound transmission according to claim 5, which includes control means operatively connected to said converter and operable to prevent said converter from transmitting driving power to said output shaft.

9. A hydromechanical compound transmission according to claim 5, which includes a two-plane spur gear planetary gear transmission, which comprises: a first set of planetary gears and a second set of planetary gears, the planetary gears of one of said two sets being larger than the planetary gears of the other one of said two sets, a planetary gear carrier carrying said sets of planetary gears, a first sun wheel arranged for cooperation with said first set of planetary gears and drivingly connected to said input shaft, a second sun wheel arranged for cooperation with said second set of planetary gears and drivingly connected to said output shaft, a gear ring having its teeth in mesh with the larger planetary gears and being drivingly connected to the pumping wheel of said torque converter; said free wheel means being interposed between said planetary gear carrier and said stationary element.

10. A hydromechanical compound transmission according to claim 5, which comprises: a two-plane spur gear planetary gear transmission; said two-plane spur gear planetary gear transmission including a first set of planetary gears and a second set of planetary gears, the planetary gears of one of said two sets being larger than the planetary gears of the other one of said two sets, a planetary gear carrier carrying said sets of planetary gears, a first sun wheel arranged for cooperation with said first set and drivingly connected to said input shaft, a second sun wheel arranged for cooperation with said second set and drivingly connected to said output shaft, a gear ring having its teeth in mesh with the larger planetary gears and being drivingly connected to the pumping wheel of said torque converter; and blocking means operable selectively for blocking said gear ring; said free wheel means being interposed between said planetary gear carrier and said stationary element.

11. A hydromechanical compound transmission according to claim 5, which comprises: a two-plane spur gear planetary gear transmission; said two-plane spur gear planetary gear transmission including a first set of planetary gears and a second set of planetary gears, the planetary gears of one of said two sets being larger than the planetary gears of the other one of said two sets, a planetary gear carrier carrying said sets of planetary gears, a first sun wheel arranged for cooperation with said first set and drivingly connected to said input shaft, a second sun wheel arranged for cooperation with said second set and drivingly connected to said output shaft, a gear ring having its teeth in mesh with the larger planetary gears and being drivingly connected to the pumping wheel of said torque converter; one-way coupling means arranged in the driving connection between said gear ring and said pumping wheel; an additional gear ring meshing with the smaller planetary gears, and means operable selectively for holding said two gear rings stationary; said free wheel means being interposed between said planetary gear carrier and said stationary element.

12. A hydromechanical compound transmission according to claim 5, which includes: a two-plane spur gear planetary gear transmission having a first set of planetary gears and a second set of planetary gears, the planetary gears of one of said two sets being larger than the planetary gears of the other one of said two sets, a planetary gear carrier carrying said sets of planetary gears, a first sun wheel arranged for cooperation with said first set and drivingly connected to said input shaft, a second sun wheel arranged for cooperation with said second set and drivingly connected to said output shaft, a first gear ring having its teeth in mesh with the larger planetary gears and having a driving connection with said pumping wheel of said torque converter, additional free wheel means arranged within said driving connection, a second gear ring having its teeth in mesh with the smaller planetary gears, blocking means operable selectively for holding said first and second gear rings stationary, and additional blocking means operable selectively to hold said planetary gear carrier stationary.

References Cited in the file of this patent

UNITED STATES PATENTS

| | | |
|---|---|---|
| 2,281,077 | Pollard | Apr. 28, 1942 |
| 2,293,358 | Pollard | Aug. 18, 1942 |
| 2,578,450 | Pollard | Dec. 11, 1951 |
| 2,687,657 | Kugel et al. | Aug. 31, 1954 |
| 2,806,387 | Forster et al. | Sept. 17, 1957 |